US010230121B2

United States Patent
Buvat et al.

(10) Patent No.: US 10,230,121 B2
(45) Date of Patent: Mar. 12, 2019

(54) COPOLYMERS COMPRISING CROSSLINKABLE PROTOGENIC GROUPS WHICH CAN BE USED TO CONSTITUTE FUEL CELL MEMBRANES

(71) Applicant: COMMISSARIAT À L'ÉNERGIE ATOMIQUE ET AUX ÉNERGIES ALTERNATIVES, Paris (FR)

(72) Inventors: Pierrick Buvat, Montbazon (FR); Janick Bigarre, Tours (FR); Julien Souquet-Grumey, Poitiers (FR); Ghislain David, Montpellier (FR); Etienne Labalme, Aramon (FR); Cédric Loubat, Vendargues (FR); Gilles Boutevin, St. Clement de Riviere (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 163 days.

(21) Appl. No.: 15/103,062

(22) PCT Filed: Dec. 11, 2014

(86) PCT No.: PCT/EP2014/077354
§ 371 (c)(1),
(2) Date: Jun. 9, 2016

(87) PCT Pub. No.: WO2015/086736
PCT Pub. Date: Jun. 18, 2015

(65) Prior Publication Data
US 2016/0308230 A1 Oct. 20, 2016

(30) Foreign Application Priority Data

Dec. 13, 2013 (FR) ...................................... 13 62634

(51) Int. Cl.
*H01M 8/10* (2016.01)
*C08F 230/02* (2006.01)
(Continued)

(52) U.S. Cl.
CPC ....... *H01M 8/1032* (2013.01); *C08F 214/247* (2013.01); *H01M 8/1023* (2013.01);
(Continued)

(58) Field of Classification Search
CPC ............. H01M 8/1032; H01M 8/1023; H01M 8/1039; H01M 8/1034; H01M 8/1072; H01M 2208/1095; C08F 214/247; C08F 2216/1475
USPC .......................................................... 521/27
See application file for complete search history.

(56) References Cited

U.S. PATENT DOCUMENTS 6,133,472 A * 10/2000 Nalewajek .............. C07C 43/17
554/225
2011/0082312 A1* 4/2011 Ignatyev ............. B01F 17/0035
560/184

(Continued)

FOREIGN PATENT DOCUMENTS

FR 2843398 A1 * 2/2004 ............. B01D 71/32
WO 9936381 A1 7/1999
(Continued)

OTHER PUBLICATIONS

Unpublished U.S. Appl. No. 14/785,005, filed Oct. 16, 2015.
Unpublished U.S. Appl. No. 14/785,066, filed Oct. 16, 2015.

Primary Examiner — Michael Bernshteyn

(57) ABSTRACT

The invention relates to copolymers comprising:
at least one recurrent unit of the following formula (I):

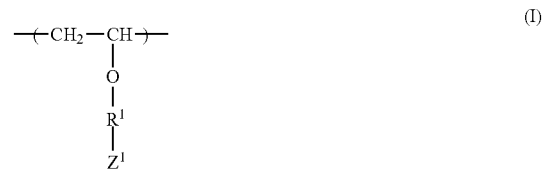

at least one recurrent unit of the following formula (II):

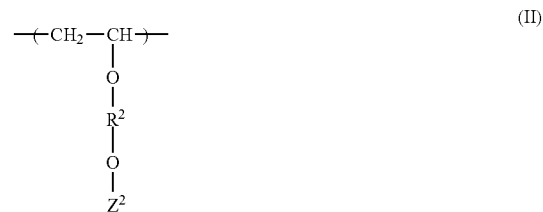

and
at least one recurrent unit of the following formula (III):

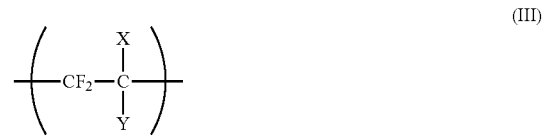

wherein:
$R^1$ and $R^2$ represent, independently of each other, an alkylene group;
$Z^1$ is a group of formula —$PO_3R_3R_4$, $R_3$ and $R_4$ representing, independently of each other, a hydrogen atom, an alkyl group or a cation;
$Z^2$ is a group of formula —$SO_2R_5$, $R_5$ representing an alkyl group or an aryl group;
X and Y represent, independently of each other, a halogen atom or a perfluorocarbon group.

13 Claims, No Drawings

(51) Int. Cl.
  *H01M 8/1032* (2016.01)
  *C08F 214/24* (2006.01)
  *H01M 8/1023* (2016.01)
  *H01M 8/1039* (2016.01)
  *H01M 8/1034* (2016.01)
  *H01M 8/1072* (2016.01)
  *C08F 216/14* (2006.01)
  *H01M 8/1018* (2016.01)

(52) U.S. Cl.
  CPC ....... *H01M 8/1034* (2013.01); *H01M 8/1039* (2013.01); *H01M 8/1072* (2013.01); *C08F 2216/1475* (2013.01); *H01M 2008/1095* (2013.01)

(56) References Cited

U.S. PATENT DOCUMENTS

| | | | |
|---|---|---|---|
| 2012/0219878 A1* | 8/2012 | Tayouo | ............... B01D 71/32 429/482 |
| 2014/0113215 A1 | 4/2014 | Buvat et al. | |
| 2014/0309318 A1 | 10/2014 | Buvat et al. | |
| 2014/0309386 A1 | 10/2014 | Buvat et al. | |

FOREIGN PATENT DOCUMENTS

| | | | | |
|---|---|---|---|---|
| WO | WO 9936381 A1 * | 7/1999 | ............. | C07C 43/17 |
| WO | 2011048076 A1 | 4/2011 | | |
| WO | WO 2011048076 A1 * | 4/2011 | ............. | B01D 71/32 |

* cited by examiner

COPOLYMERS COMPRISING CROSSLINKABLE PROTOGENIC GROUPS WHICH CAN BE USED TO CONSTITUTE FUEL CELL MEMBRANES

CROSS-REFERENCE TO RELATED APPLICATIONS

This application is a U.S. national phase under the provisions of 35 U.S.C. § 371 of International Patent Application No. PCT/EP14/77354 filed Dec. 11, 2014, which in turn claims priority of French Patent Application No. 1362634 filed Dec. 13, 2013. The disclosures of such international patent application and French priority patent application are hereby incorporated herein by reference in their respective entireties, for all purposes.

TECHNICAL FIELD

The present invention relates to original crosslinkable copolymers comprising specific protogenic groups, a portion of which makes up crosslinkable groups.

These crosslinkable copolymers, having excellent physico-chemical capabilities, in particular, in terms of ion exchange capacity, thermal stability, chemical stability (such as chemical inertia and insolubility) capacities and of mechanical properties, may find their application in the preparation of ion exchange membranes, intended for fuel cells, in particular for PEMFC (meaning "Proton Exchange Membrane Fuel Cell") and DMFC (meaning "Direct Methanol Fuel Cell") fuel cells.

STATE OF THE PRIOR ART

A fuel cell conventionally includes a stack of elementary cells within which an electrochemical reaction takes place between two reagents which are introduced continuously. The fuel, such as hydrogen, for cells operating with hydrogen/oxygen mixtures (PEMFC) or methanol for cells operating with methanol/oxygen mixtures (DMFC), is brought into contact with the anode, while the oxidizer, generally oxygen, is brought into contact with the cathode. The anode and the cathode are separated by an electrolyte, of the ion exchange membrane type. The electrochemical reaction, the energy of which is converted into electric energy, is split into two half-reactions:

an oxidation of the fuel, taking place at the anode/electrolyte interface producing, in the case of hydrogen cells protons $H^+$, which will cross the electrolyte towards the cathode, and electrons, which reach the outer circuit, in order to participate in the production of electric energy;

a reduction of the oxidizer, taking place at the electrolyte/cathode interface, with production of water, in the case of hydrogen cells.

The electrochemical reaction takes place at an electrode-membrane-electrode assembly.

The electrode-membrane-electrode assembly is a very thin assembly with a thickness of the order of one millimeter and each electrode is supplied with fuel and oxidizer gases for example by means of a splined plate, a so-called bipolar plate.

The ion conducting membrane is generally an organic membrane comprising ion groups which, in the presence of water, allow conduction of the protons produced at the anode by oxidation of the hydrogen.

More specifically, in an aqueous medium, the acid groups borne by the membranes totally dissociate and release free protons which are surrounded with one or several water molecules, thus ensuring a transport of protons according to a carrier mechanism ensured by the hydration water. The mobility of the protons in the membrane is therefore closely related to the water content (i.e., in other words, to the swelling capability of the membrane) and to the conductivity of the membrane (related to the number of acid sites of the latter).

In addition to the capability of ensuring proton conduction, the membranes also have to meet the following specificities:

low permeability to gases (notably to $H_2$ gas for PEMFC cells and to methanol vapor for the DMFC cells), in order to ensure a good seal between the anode and cathode compartments of the cell as well as a maximum electric and catalytic yield;

sufficient absorption of water in order to promote a good swelling level, in order to ensure good proton transport from a dissociation of acid protons, thereby forming a hydrated ion phase in the totality of the volume of the membrane;

good electrochemical and mechanical stability, notably reaction innocuousness towards reactive gases (such as hydrogen or methanol vapors) and a resistance to gas pressures to which is subject the cell.

In order to attempt to overcome such requirements, the first polymers to have been elaborated are polymers having protogenic groups of the sulfonic acid type, more particularly sulfonic perfluorinated polymers such as Nafion®. These polymers have good proton transfer by means of strong acidity related to the sulfonic acid groups and to a significant hydration number $\lambda$ ($\lambda > 15$, being defined as the number of water molecules per protogenic group). However, membranes elaborated from these polymers only have actual efficiency for strong hydration levels and are thus limited to uses at low temperatures (i.e., temperatures below 85° C.) and high relative humidity (for example, above 80%). Furthermore, they have permeability to alcohols, in particular to methanol, which makes them incompatible with a use in DMFC cells. Finally, they may have a high cost.

In order to counter these drawbacks, other alternatives have been proposed for making membranes for fuel cells.

Thus, certain authors have proposed the making of membranes from copolymers comprising phosphonic acid groups which allow use of the cell at temperatures above 85° C., in particular at temperatures above 100° C. and under anhydrous conditions, with however the drawbacks inherent to these phosphonic acid groups, i.e.:

a lower acidity of the phosphonic acid groups than that of sulfonic acid groups, which requires a higher level of presence of these groups in polymers than that of sulfonic acid groups in order to obtain equivalent conduction; and difficulties for synthesizing this type of polymer.

The inventors propose to develop novel copolymers, which may be used, either in a cross-linked form or not, for making up membranes for fuel cells, which meets the following requirements:

a significant level of phosphonated and/or phosphonic acid groups;

a high proton conductivity for temperatures ranging from room temperature up to 150° C. and for relative humidities of less than 50%;

heat stability at high temperatures, for example, ranging up to 150° C.;

a facility for being shaped as a membrane, notably related to the capability of these copolymers of being solubilized in organic solvents, such as dimethylsulfoxide;

a facility for synthesizing these copolymers;

a capability of being cross-linked by means of the presence of specific groups.

DISCUSSION OF THE INVENTION

Copolymers meeting the specificities mentioned above are copolymers comprising:

at least one recurrent unit of the following formula (I):

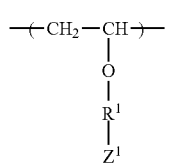

(I)

at least one recurrent unit of the following formula (II):

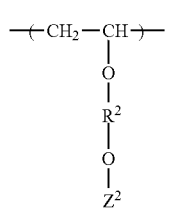

(II)

and at least one recurrent unit of the following formula (III):

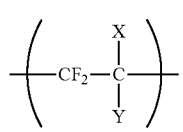

(III)

wherein:

$R^1$ and $R^2$ represent independently of each other, an alkylene group;

$Z^1$ is a group of formula $-PO_3R_3R_4$, $R_3$ and $R_4$ representing, independently of each other, a hydrogen atom, an alkyl group or a cation;

$Z^2$ is a group of formula $-SO_2R_5$, $R_5$ representing an alkyl group or an aryl group;

X and Y represent, independently of each other, a halogen atom or a perfluorocarbon group.

Before entering in a more detailed way the description, we propose the following definitions.

By perfluorocarbon group, is conventionally meant, in the foregoing and in the following, a group exclusively comprising carbon atoms and fluorine atoms. For example, this may be a perfluoroalkyl group, comprising from 1 to 6 carbon atoms, such as a perfluoromethyl group $-CF_3$.

By alkylene group is conventionally meant, an alkyl group forming a bridge between two other groups for example comprising from 1 to 10 carbon atoms, such as an ethylene group of formula $-CH_2-CH_2-$, a n-butylene group of formula $-CH_2-CH_2-CH_2-CH_2-$.

By alkyl group is conventionally meant, in the foregoing and in the following, a linear or branched alkyl group of formula $-C_nH_{2n+1}$, n corresponding to the number of carbon atoms, this number may range of 1 to 10. In particular, this may be an n-propyl group of formula $-CH_2-CH_2-CH_3$.

By aryl group is conventionally meant, in the foregoing and in the following, an aryl group comprising from 6 to 18 carbon atoms, such as a phenyl group, said aryl group may be substituted with one or several alkyl groups.

According to the invention, $R^1$ may be a group $-CH_2-CH_2-$ and $R^2$ may be a group of formula $-CH_2-CH_2-CH_2-CH_2-$.

According to the invention, X and Y may each represent a halogen atom, such as the fluorine atom and the chlorine atom, at least one of the X or Y groups preferably being a fluorine atom or X may represent a perfluoroalkyl group, such as $-CF_3$ while Y represents a halogen atom, such as F.

The copolymers of the invention may comprise:

from 5 to 94.9% molar, ideally from 40 to 80% molar of a recurrent unit of formula (I);

from 0.1 to 30% molar, ideally from 1 to 20% molar of a recurrent unit of formula (II); and from 5 to 94.94% molar, ideally from 20 to 59% molar of a recurrent unit of formula (III).

The number molecular mass of the copolymers of the invention may range of 1,000 to 100,000 g·mol$^{-1}$ and, more particularly, from 5,000 to 30,000 g·mol$^{-1}$.

In addition to the recurrent units of formulae (I), (II) and (III) mentioned above, the copolymers may further comprise at least one recurrent unit of the following formula (IV):

(IV)

wherein $R^6$ is an alkyl group which may comprise from 1 to 10 carbon atoms, such as an n-propyl group $-CH_2-CH_2-CH_3$.

From a structural point of view, the copolymers of the invention may be random copolymers (which means that the aforementioned recurrent units are distributed randomly in the backbone or the main chain of the copolymer), alternating copolymers (which means that there is an alternation between a recurrent unit of formula (I), a recurrent unit of formula (II), a recurrent unit of formula (III) and optionally a recurrent unit of formula (IV) in the backbone or the main chain of the copolymer.

From among the copolymers compliant with the present invention, mention may be made of the following particular copolymers:

copolymers comprising as a recurrent unit compliant with formula (I) a recurrent unit of the following formula (Ia):

(Ia)

$Z^1$ being a group of formula $-PO_3R_3R_4$, with $R_3$ and $R_4$ being as defined above, $R_3$ and $R_4$ for example may be an ethyl group;

as a unit compliant with formula (II), a recurrent unit of the following formula (IIa):

(IIa)

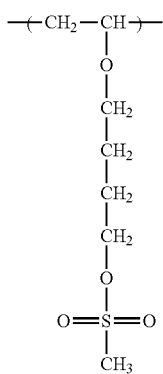

and as a unit compliant with formula (III), a recurrent unit of the following formula (IIIa):

(IIIa)

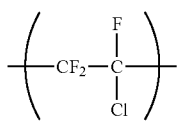

copolymers comprising as a recurrent unit compliant with formula (I), a recurrent unit of the following formula (Ia):

(Ia)

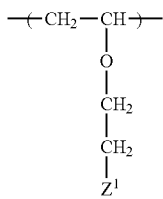

$Z^1$ being a group of formula $-PO_3R_3R_4$, with $R_3$ and $R_4$ being as defined above, $R_3$ and $R_4$ for example may be an ethyl group;

as a unit compliant with formula (II), a recurrent unit of the following formula (IIb):

(IIb)

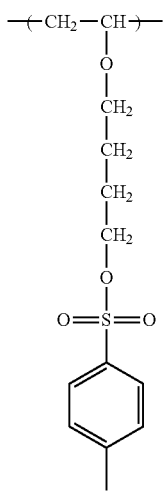

and as a unit compliant with formula (III), a recurrent unit of the following formula (IIIa):

(IIIa)

The copolymers of the invention may be prepared by a simple application method comprising:
a copolymerization step, in the presence of at least one free radical initiator, of at least one monomer of formula (V), of at least one monomer of formula (VI), of at least one monomer of formula (VII) and optionally at least one monomer of formula (VIII):

(V)

(VI)

(VII)

(VIII)

wherein $R^1$, $Z^1$, $R^2$, $Z^2$, X, Y and $R^6$ are as defined above;
optionally, a step for hydrolysis of the $-PO_3R_3R_4$ group (when $R_3$ and $R_4$ represent an alkyl group), in return for which said group is transformed into a group $-PO_3R_3R_4$, with $R_3$ and $R_4$ representing a hydrogen atom or a cation.

An efficient free radical initiator within the scope of this method may be selected from perpivalate derivatives, such as tertiobutyl perpivalate.

The polymerization step is advantageously carried out in an aprotic polar solvent, which may be selected from the following solvents:
dimethylformamide (DMF);
acetonitrile;
a halogenated solvent, such as 1,1,2-trifluoro-1,2,2-trichloroethane, 1,1,1,3,3-pentafluorobutane;
tetrahydrofurane;
water, and
mixtures thereof.

In the case when the monomers used exist in a gaseous form (which is notably the case of the chlorotrifluoroethylene monomer) and when the reaction occurs under pressure, the latter may be applied in an autoclave.

The optional hydrolysis step may be carried out, for example, at a temperature ranging from 50° C. to 120° C., by contacting an acid agent, such as hydrochloric acid or sulfuric acid.

From among the monomers used within the scope of the method, the monomers of formula (VI) are novel and are also an object of the invention.

The resulting copolymer may then undergo an isolation step by precipitation, for example with distilled water and then be subject to a drying step.

As already mentioned above, the copolymers of the invention are crosslinkable copolymers notably due to the presence of $Z^2$ groups of the recurrent units of formula (II).

The cross-linking of such copolymers, via the reaction of the $Z^2$ groups, contributes to the formation of cross-linked materials having reinforced mechanical properties, notably, under a wet condition as compared with the copolymers from which the materials stem.

Thus, the invention also relates to a cross-linked material which may be obtained by a method comprising a heat cross-linking step of at least one copolymer according to the invention.

More specifically, the heat cross-linking step may consist of heating the copolymer(s) compliant with the invention to a temperature for example ranging from 100 to 200° C., preferably ranging from 140 to 170° C., the copolymer before heating may be shaped as a membrane.

In the case when the cross-linked material includes groups of formula —$PO_3R_3R_4$ not hydrolyzed (i.e., in other words, when $R_3$ and $R_4$ represent an alkyl group), within the scope of the method for preparing the cross-linked material, after the heat cross-linking step, a hydrolysis step of said groups may be contemplated so as to transform said phosphonate groups of formula —$PO_3R_3R_4$ into a phosphonic acid group or a salt thereof (which means, in other words, that $R^3$ and $R^4$ correspond, after hydrolysis to a hydrogen atom or a cation).

This hydrolysis step may be carried out at a temperature ranging from 50 to 120° C., by putting the cross-linked material in contact with an acid agent, such as hydrochloric acid or sulfuric acid.

The copolymers according to the invention, as mentioned earlier, as well as the cross-linked materials have the particularity of having good chemical and mechanical stability notably at temperatures above 100° C., or even ranging up to 250° C. and this, independently of the cross-linking level if necessary.

Consequently, the object of the present invention is also a membrane comprising at least one copolymer as described above and/or at least one cross-linked material as defined above.

When they consist of at least one copolymer as defined above, they may be prepared in a conventional way, for example by casting, i.e. the copolymer is put into solution in an adequate solvent, such as dimethylformamide, and then applied on a planar surface, for example, a glass plate, by means of a device, such as a hand applicator.

The copolymer forming a humid film is then dried in order to form a film with adequate thickness, for example from 15 to 150 μm, and then detached from the substrate.

When they consist of the cross-linked material, they may be prepared in a similar way as explained above, when reference is made to the preparation of the cross-linked material as such.

Such membranes, when the —$PO_3R_3R_4$ groups are phosphonic acid groups, having a very high ion exchange capability, which may range up to 5.5 mequiv·$g^{-1}$. Consequently, these membranes may notably be used for isolating the anode and cathode compartments of a fuel cell which may operate with the following systems:

hydrogen, alcohols, such as methanol at the anode;
oxygen, air at the cathode.

Thus, the object of the present invention is also a fuel cell device comprising at least one cell comprising two electrodes positioned on either side of a membrane as defined above.

In order to prepare such a device, the membrane is placed between two electrodes, for example in tissue paper or carbon, optionally plated with platinum, and impregnated for example by the copolymer, according to the invention. The assembly is pressed by heating.

This assembly is then inserted between two plates (for example, in graphite, called bipolar plates, which ensure the distribution of the gases and the electric conductivity).

The invention will now be described, with reference to the following examples, given as an indication and not as a limitation.

DETAILED DISCUSSION OF PARTICULAR EMBODIMENTS

Example 1

This example relates to the preparation of a copolymer according to the invention by copolymerization of chlorotrifluoroethylene (symbolized by the acronym CTFE), of a specific ethylvinylether (symbolized by the acronym DEVEP) and a specific butylvinylether (symbolized by the acronym BVEMs). In order to obtain an ultimate 10% cross-linking level (cf. Example 3), the following molar proportions (CTFE)/(DEVEP)/(BVEMs) 50/40/10 are used.

The aforementioned monomers CTFE, DEVEP and BVEMs respectively fit the following formulae:

For CTFE:

For DEVEP:

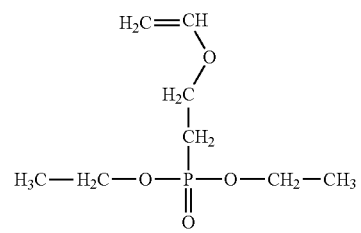

For BVEMs:

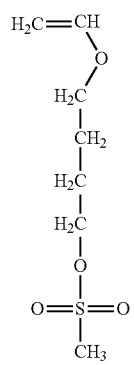

CTFE appears in a gaseous form, which requires the use of an autoclave for applying the preparation of the copolymer.

The autoclave is provided with a mechanical stirrer, with two valves (an input valve and a gas output valve), with a safety disc and an accurate manometer.

In a first phase, $K_2CO_3$, as a powder is introduced into an autoclave, in an amount of 3% molar relatively to BVEMs and DEVEP. The autoclave is then placed in vacuo for about 40 minutes. The DEVEP (13.3 g), the BVEMs (3.3 g), tertiobutyl perpivalate (0.8 g) (in an amount of 1% molar relatively to BVEMs and EVE) and CTFE (10 g) are then introduced.

The autoclave is then placed with stirring and gradually heated up to 75° C. for about 15 hours. The product of the reaction is dissolved in acetone and then precipitated from methanol and placed in vacuo at 50° C. with view to drying.

The yield of the reaction is 72%.

The structure of the copolymer is controlled by NMR ($^1$H and $^{19}$F NMR), differential scanning calorimetry (subsequently entitled DSC), thermogravimetry analysis (subsequently entitled ATG) and by elementary analysis.

Example 2

The operating procedure for obtaining the crosslinkable copolymers of this example remain similar to the one followed in Example 1, except that BVEMs is replaced with tosylated butylvinylether of the following formula:

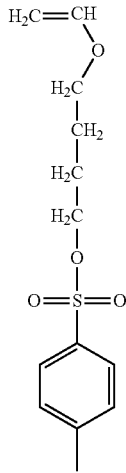

subsequently entitled BVETs.

In order to obtain subsequently a 10% cross-linking level (cf. Example 3), the molar proportions (CTFE)/(DEVEP)/(BVETs): 50/40/10 are used.

The structure of the copolymer is controlled by NMR ($^1$H and $^{19}$F NMR), DSC, ATG.

Example 3

This example illustrates the method for applying the cross-linking and the shaping of the crosslinkable copolymers prepared according to Examples 1 and 2 explained above.

To do this, in a first phase, it is proceeded with putting into solution the copolymer in an organic solvent, dimethylformamide (DMF), the solvent representing 69% based on the mass of the copolymer.

In a second phase, the obtained viscous mixture is deposited on a glass plate by means of a hand applicator placed under a hood with lamina flow. Next, slow evaporation of the solvent is ensured by placing the glass plate in an oven, the temperature of which is set to 80° C. for 12 hours. And the cross-linking reaction is then conducted by placing the glass plate in an oven, the temperature of which is set to 150° C. for 12 hours.

Finally fluorophosphonated membranes insoluble in aqueous and organic solvents such as water, methanol, acetone, methylethylketone, tetrahydrofurane, dimethylsulfoxide and dimethylformamide are finally obtained.

The invention claimed is:

1. A copolymer comprising:

at least one recurrent unit of the following formula (I):

at least one recurrent unit of the following formula (II):

and at least one recurrent unit of the following formula (III):

wherein:

R$^1$ and R$^2$ represent, independently of each other, an alkylene group;

Z$^1$ is a group of formula —PO$_3$R$_3$R$_4$, R$_3$ and R$_4$ representing, independently of each other, a hydrogen atom, an alkyl group or a cation;

Z$^2$ is a group of formula —SO$_2$R$_5$, R$_5$ representing an alkyl group or an aryl group;

X and Y represent, independently of each other, a halogen atom or a perfluorocarbon group.

2. The copolymer according to claim 1, wherein R$^1$ is a group of formula —CH$_2$—CH$_2$—.

3. The copolymer according to claim 1, wherein R$^2$ is a group of formula —CH$_2$—CH$_2$—CH$_2$—CH$_2$—.

4. The copolymer according to claim 1, wherein X and Y each represent a halogen atom, at least one of the groups X or Y being a fluorine atom.

5. The copolymer according to claim 1, wherein X represents a perfluoroalkyl group, while Y represents a halogen atom.

6. The copolymer according to claim 1, further comprising at least one recurrent unit of the following formula (IV):

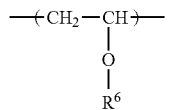

(IV)

wherein $R^6$ is an alkyl group.

7. The copolymer according to claim 1, selected from among the following copolymers:

copolymers comprising as a recurrent unit compliant with formula (I), a recurrent unit of the following formula (Ia):

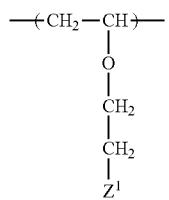

(Ia)

wherein $Z^1$ is a group of formula $—PO_3R_3R_4$, with $R_3$ and $R_4$ as defined in claim 1;

as a unit compliant with formula (II), a recurrent unit of the following formula (IIa):

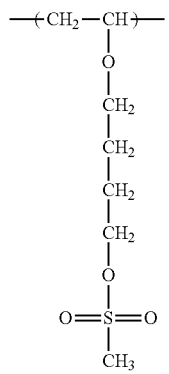

(IIa)

and as a unit compliant with formula (III), a recurrent unit of the following formula (IIIa):

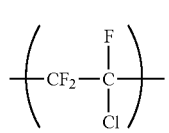

(IIIa)

copolymers comprising as a recurrent unit compliant with formula (I), a recurrent unit of the following formula (Ia):

(Ia)

wherein $Z^1$ is a group of formula $—PO_3R_3R_4$, with $R_3$ and $R_4$ as defined in claim 1;

as a unit compliant with formula (II), a recurrent unit of the following formula (IIb):

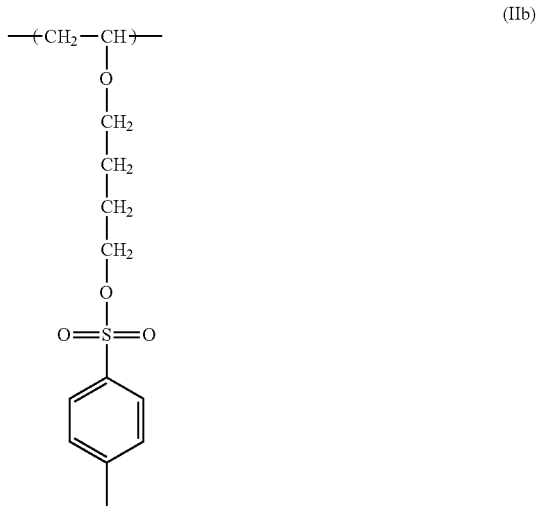 [SMILES: CCC(C)OCCCCOS(=O)(=O)c1ccc(C)cc1]

(IIb)

and as a unit compliant with formula (III), a recurrent unit of the following formula (IIIa):

(IIIa)

8. A method for preparing a copolymer as defined in claim 1 comprising the following steps:

a copolymerization step, in the presence of at least one free radical initiator, of at least one monomer of formula (V), of at least one monomer of formula (VI), of at least one monomer of formula (VII) and optionally at least one monomer of formula (VIII):

(V)

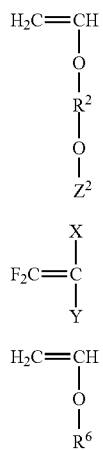

wherein $R^1$, $Z^1$, $R^2$, $Z^2$, X, and Y are as defined in claim 1 and $R^6$ is an alkyl group;

optionally, a step for hydrolysis of the $-PO_3R_3R_4$ group (when $R_3$ and $R_4$ represent an alkyl group), in return for which said group is transformed into a $-PO_3R_3R_4$ group, with $R_3$ and $R_4$ representing a hydrogen atom or a cation.

9. A cross-linked material obtained by a method comprising a heat cross-linking step of at least one copolymer as defined according to claim 1.

10. The cross-linked material according to claim 9, wherein the heat cross-linking step consists of heating the copolymer(s) to a temperature ranging from 100 to 200° C., wherein the copolymer may be shaped as a membrane prior to heating.

11. A membrane comprising at least one copolymer as defined according to claim 1 and/or a cross-linked material obtained by a method comprising a heat cross-linking step of at least one copolymer as defined according to claim 1.

12. A fuel cell device comprising at least one cell comprising two electrodes positioned on either side of a membrane as defined in claim 11.

13. The cross-linked material according to claim 9, wherein the heat cross-linking step consists of heating the copolymer(s) to a temperature ranging from 140 to 170° C.

* * * * *